(12) United States Patent
    Grupp et al.

(10) Patent No.: US 12,565,024 B2
(45) Date of Patent: Mar. 3, 2026

(54) UNDERRIDE PROTECTION DEVICE AND METHOD FOR PRODUCING AN UNDERRIDE PROTECTION DEVICE

(71) Applicant: Dr. Ing. h.c. F. Porsche Aktiengesellschaft, Stuttgart (DE)

(72) Inventors: Markus Grupp, Steinheim am Albuch (DE); Salvatore Maltisotto, Gäufelden (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 195 days.

(21) Appl. No.: 18/218,642

(22) Filed: Jul. 6, 2023

(65) Prior Publication Data

US 2024/0009959 A1 Jan. 11, 2024

(30) Foreign Application Priority Data

Jul. 7, 2022 (DE) ...................... 10 2022 116 978.2

(51) Int. Cl.
    B32B 5/26 (2006.01)
    B29C 43/18 (2006.01)
    (Continued)

(52) U.S. Cl.
    CPC .................. B32B 5/26 (2013.01); B32B 3/30 (2013.01); B32B 5/02 (2013.01); B32B 5/18 (2013.01);
    (Continued)

(58) Field of Classification Search
    CPC .... B32B 5/26; B32B 3/30; B32B 5/02; B32B 5/18; B32B 5/245; B32B 2260/023; B32B 2260/046; B32B 2262/101; B32B 2266/0278; B32B 2307/72; B32B 2571/00; B62D 25/2072; B62D 29/043;
(Continued)

(56) References Cited

U.S. PATENT DOCUMENTS

| | | | |
|---|---|---|---|
| 11,034,227 B2 | 6/2021 | Spielvogel et al. | |
| 2010/0143661 A1 | 6/2010 | Warrick | |

(Continued)

FOREIGN PATENT DOCUMENTS

| | | |
|---|---|---|
| DE | 1778627 A1 | 8/1971 |
| DE | 102010013022 A1 | 9/2011 |

(Continued)

OTHER PUBLICATIONS

Baydur60_2020 (Year: 2020).*
Zurowski_2021 (Year: 2021).*

*Primary Examiner* — Travis M Figg
(74) *Attorney, Agent, or Firm* — Buchanan Ingersoll & Rooney PC

(57) ABSTRACT

An underride protection device for a battery-electric vehicle, having a sandwich arrangement with a core layer arranged between an upper cover layer and a lower cover layer made of a fiber-reinforced plastic material. In order to functionally improve the underride protection device, ribs are arranged on the upper cover layer, which are materially connected to the upper cover layer, wherein the ribs arranged on the upper cover layer are surrounded by a respective top layer, which is materially connected to the upper cover layer at two retaining sections.

14 Claims, 1 Drawing Sheet

(51) Int. Cl.

| | |
|---|---|
| *B29C 43/20* | (2006.01) |
| *B29K 75/00* | (2006.01) |
| *B29K 105/04* | (2006.01) |
| *B29K 309/08* | (2006.01) |
| *B29L 31/30* | (2006.01) |
| *B32B 3/30* | (2006.01) |
| *B32B 5/02* | (2006.01) |
| *B32B 5/18* | (2006.01) |
| *B32B 5/24* | (2006.01) |
| *B60L 50/60* | (2019.01) |
| *B62D 25/20* | (2006.01) |
| *B62D 29/04* | (2006.01) |

(52) U.S. Cl.
CPC .......... *B32B 5/245* (2013.01); *B62D 25/2072* (2013.01); *B29C 43/18* (2013.01); *B29C 43/203* (2013.01); *B29K 2075/00* (2013.01); *B29K 2105/04* (2013.01); *B29K 2309/08* (2013.01); *B29L 2031/30* (2013.01); *B32B 2260/023* (2013.01); *B32B 2260/046* (2013.01); *B32B 2262/101* (2013.01); *B32B 2266/0278* (2013.01); *B32B 2307/72* (2013.01); *B32B 2571/00* (2013.01); *B60L 50/60* (2019.02); *B62D 29/043* (2013.01)

(58) Field of Classification Search
CPC ....... B60L 50/60; B29C 43/18; B29C 43/203; B29K 2075/00; B29K 2105/04; B29K 2309/08; B29L 2031/30
See application file for complete search history.

(56) References Cited

U.S. PATENT DOCUMENTS

| | | | |
|---|---|---|---|
| 2012/0103714 A1 | 5/2012 | Choi et al. | |
| 2015/0292199 A1* | 10/2015 | Federici | .................. B32B 3/263 |
| | | | 428/141 |
| 2016/0264082 A1* | 9/2016 | Berger | .................... B60R 19/03 |
| 2016/0332675 A1* | 11/2016 | Yang | ......................... B32B 7/14 |
| 2021/0138886 A1 | 5/2021 | Spielvogel et al. | |
| 2021/0351455 A1 | 11/2021 | Kim et al. | |
| 2022/0212530 A1* | 7/2022 | Rausch | .................. B60K 11/02 |

FOREIGN PATENT DOCUMENTS

| | | | |
|---|---|---|---|
| DE | 102011005403 | A1 | 6/2012 |
| DE | 202014008336 | U1 | 1/2016 |
| DE | 102019206646 | A1 | 11/2020 |
| EP | 3350063 | A2 | 7/2018 |
| EP | 3582989 | A1 | 12/2019 |
| WO | 2019001357 | A1 | 1/2019 |

* cited by examiner

UNDERRIDE PROTECTION DEVICE AND METHOD FOR PRODUCING AN UNDERRIDE PROTECTION DEVICE

CROSS-REFERENCE TO RELATED APPLICATION

This application claims priority to German Patent Application No. 10 2022 116 978.2, filed Jul. 7, 2022, the content of such application being incorporated by reference herein in its entirety.

FIELD OF THE INVENTION

The invention relates to an underride protection device for a battery-electric vehicle, having a sandwich arrangement with a core layer arranged between an upper cover layer and a lower cover layer made of a fiber-reinforced plastic material. The invention further relates to a method for producing such an underride protection device.

BACKGROUND OF THE INVENTION

DE 102010013022 A1, which is incorporated by reference herein, discloses a method for producing an underbody panel made of glass fiber-reinforced plastic, which is intended to receive a traction battery. DE 102011005403 A1, which is incorporated by reference herein, describes a battery pack, the top cover of which is affixed to the vehicle floor, wherein a lower housing consisting of two plates is molded from glass fiber-reinforced plastic. The German utility model specification DE 202014008336 U1, which is incorporated by reference herein, discloses a chassis with modular battery pads for an electric vehicle, whose supporting construction is made of a torsion-resistant and highly-load-bearing three-ply sandwich composite with a foam core and two outer layers made of glass and carbon fiber-reinforced plastic, said layers being sewn together. EP 3350063 B1, which is incorporated by reference herein, discloses a raw body with an underbody made of glass fiber-reinforced plastic, which is glued to metallic sills in a galvanically insulating manner. EP 3582989 A1, which is incorporated by reference herein, discloses a battery structure for an electric vehicle having a battery case and a protection device comprising a top band and a bottom band between which a core is arranged, wherein the top band comprises a wave-shaped cross-section. US 2021138886 A1, which is incorporated by reference herein, discloses a battery case having a sandwich core made of polymeth-acrylimide hard foam material. The international publication WO 19001357 A1, which is incorporated by reference herein, discloses a sandwich-type battery case with glass or carbon fiber-reinforced outer layers. US 2021351455 A1, which is incorporated by reference herein, discloses a laminated battery case with a two-piece steel frame and a plastic heat sink reinforced with fiberglass and cured in a hot press. DE 102019206646 A1, which is incorporated by reference herein, discloses an underride protection in a sandwich arrangement with an upper cover plate and a lower cover plate, wherein a thermal insulation material, in particular a filling foam, is arranged between the upper cover plate and the lower cover plate, wherein the upper side of the sandwich arrangement comprises a profiling configured via bars or ribs.

SUMMARY OF THE INVENTION

One problem addressed by the invention is to functionally improve an underride protection device for a battery-electric vehicle, having a sandwich arrangement with a core layer arranged between an upper cover layer and a lower cover layer made of a fiber-reinforced plastic material.

In view of the above, described herein is an underride protection device for a battery-electric vehicle, having a sandwich arrangement comprising a core layer arranged between an upper cover layer and a lower cover layer made of a fiber-reinforced plastic material, characterized in that ribs are arranged on the upper cover layer, which are materially connected to the upper cover layer, wherein the ribs arranged on the upper cover layer are surrounded by a respective top layer, which is materially connected to the upper cover layer at two retaining sections. Thus, the stability of the underride protection device, which is also referred to briefly as the underride protection, can be significantly increased. The additional costs in the manufacture of the underride protection with the upper cover layer between the core layer and the foam ribs in a kind of double sandwich arrangement are consciously accepted. The cover layers are preferably embodied in a planar fashion. It follows that the simple sandwich arrangement with the core layer arranged between the cover layers has the shape of a rectangle in cross-section. The ribs with the top layer provide a raised structure at the top of the underride protection device. For example, a frame or a housing of a high-voltage battery can be stably supported on the ribs. On the upper cover layer, interstices between the ribs can also be utilized in order to pass a temperature control medium through suitable temperature control channels or temperature control lines.

A preferred embodiment example of the underride protection device is characterized in that the core layer is formed from polyurethane-reinforced glass fibers. Thus, in combination with the cover layers, a stable plate-shaped base structure can be provided, which can be manufactured inexpensively.

A further preferred embodiment example of the underride protection device is characterized in that the ribs are formed as foam ribs made of polyurethane. The foam ribs as polyurethane are also inexpensive to manufacture. With the polyurethane foam ribs, the underride protection can be highly effectively reinforced in combination with the upper cover layer arranged between the core layer and the foam ribs.

A further preferred embodiment example of the underride protection device is characterized in that the polyurethane foam ribs have a density of five hundred kilograms per cubic meter. The ribs serve on the one hand as spacers between a battery structure supported on the ribs and the upper cover layer between the ribs. The battery structure can be stably supported on the upper end faces of the ribs. Clearances between the ribs can be utilized otherwise.

A further preferred embodiment example of the underride protection device is characterized in that the polyurethane foam ribs in the cross-section each have the shape of a trapezoid with a base, which is materially connected to the upper cover layer. The ribs preferably each have the shape of an isosceles trapezoid in cross-section, whose cross-section decreases away from the upper cover layer. The foam ribs made of polyurethane can be designed in a continuous or interrupted longitudinal direction.

A further preferred embodiment example of the underride protection device is characterized in that the cover layers are materially connected to the core layer made of polyurethane. This easily creates a stable composite in the simple sandwich arrangement. The cover layers are preferably connected to the core layer of polyurethane by laminating or gluing.

A further preferred embodiment example of the underride protection device is characterized in that the cover layers and possibly also the top layers are formed from an epoxy resin with a volume content of sixty percent glass fibers and quartz sand. In considerations, experiments, and tests performed in the context of the present invention, the best results were achieved or expected with an epoxy resin designed in this way.

A further preferred embodiment example of the underride protection device is characterized in that the core layer and the ribs are materially connected to the upper cover layer arranged therebetween as well as to the lower cover layer and the top layer in a double sandwich arrangement. This means that the ribs are materially connected to both the upper cover layer and the top layer, for example by laminating or gluing. This creates an extremely stable and highly resilient underride protection device.

The aforementioned problem is alternatively or additionally solved in a method for producing an aforementioned underride protection device by forming the core layer from a polyurethane foam by means of long fiber injection. Thus, despite the previously described increased expense in the manufacture of the underride protection device with the double sandwich arrangement, a cost-efficient manufacture in large numbers can be realized. In long fiber injection, the fiberglass is cut and injected together with polyurethane.

First, a lower fiber layer is deposited into a suitably configured compression mold and soaked with a resin to form the lower cover layer. The core layer is then injected by means of long fiber injection. An upper fibrous layer is deposited on the core layer and soaked with a resin to form the upper cover layer. The ribs are applied to the upper cover layer. Finally, top fibrous layers are deposited on the ribs and the upper cover layer to form the top layers. Then, the press mold, also referred to as a wet mold, can be closed in order to cure the underride protection device under pressure and heat action.

The invention optionally also relates to a motor vehicle having a battery and/or a fuel tank equipped on at least one lower side with an underride protection device as described above. The motor vehicle can be a fuel cell vehicle or a hybrid vehicle. Particularly preferably, however, it is an electric vehicle with a high-voltage battery equipped with an underride protection device as described above.

Further advantages, features, and details of the invention arise from the following description, in which various embodiment examples of the invention are described in detail with reference to the drawing.

BRIEF DESCRIPTION OF THE DRAWINGS

FIG. 1 depicts an underride protection device with a double sandwich arrangement, which is shown schematically in a sectional view.

DETAILED DESCRIPTION OF THE INVENTION

In FIG. 1, an underride protection device 1, which is also referred to briefly as an underride protection, is shown schematically in a sectional view. The underride protection 1 comprises a simple sandwich arrangement 2 with a core layer 4 arranged between a lower cover layer 3 and an upper cover layer 5. The two cover layers 3 and 5 are planar. This results in the simple sandwich arrangement 2 having the core layer 4 and the two cover layers 3 and 5 having substantially the shape of a cuboid.

A rib 6 is arranged on the upper cover layer 5. The rib 6 is one of several ribs arranged on the upper cover layer 5. The rib 6 preferably extends in a longitudinal vehicle direction, also referred to as the x direction. However, depending on the design, the rib 6 can also extend in a transverse vehicle direction, also referred to as the y direction.

When viewed in cross-section, the rib 6 has the design of an isosceles trapezoid with a base, which is materially connected to the upper cover layer 5. A top base side of the trapezoid is planar in form and extends parallel to the two cover layers 3 and 5. The upper base side of the trapezoid and two trapezoid legs angled therefrom are surrounded by a top layer 7.

The top layer 7 comprises a support section 8 and two side sections 9, 10. With its support section 8 and the side sections 9 and 10, the top layer 7 is materially connected to the rib 6. Retaining sections 11, 12 are angled from the free ends of the side sections 9, 10. The retaining sections 11 and 12 are materially connected to the upper cover layer 5.

The combination of the simple sandwich arrangement 2 with the ribs 6 surrounded by a respective top layer 7 results in a double sandwich arrangement 14, in which the ribs 6, in the sections in which they are present, represent an additional core layer to the core layer 4 of the simple sandwich arrangement 2.

The core layer 4, which is also referred to briefly as a core, is made from a polyurethane, which is reinforced by glass fibers cut by means of long fiber injection. This core 4 is fitted with polyurethane foam ribs 6, in particular with a density of five hundred kilograms per cubic meter. The two cover layers 3 and 5 are formed from a glass fiber-reinforced plastic, in particular from an epoxy resin having a volume content of sixty percent glass fibers and quartz sand.

REFERENCE NUMBERS

1 Underride protection device
2 Sandwich arrangement
3 Lower cover layer
4 Core layer
5 Upper cover layer
6 Rib
7 Top layer
8 Support section
9 Side section
10 Side section
11 Retaining section
12 Retaining section
14 Double sandwich arrangement

What is claimed is:

1. An underride protection device for a battery-electric vehicle, said underride protection device comprising:
   a sandwich arrangement including a core layer arranged between (i) an upper cover layer composed of a fiber-reinforced plastic material and (ii) a lower cover layer composed of the fiber-reinforced plastic material, and
   ribs arranged on and materially connected to the upper cover layer, wherein the ribs are surrounded by a respective top layer, wherein the respective top layer is also materially connected to the upper cover layer at two retaining sections,
   wherein the upper cover layer, the lower cover layer and the top layer comprise an epoxy resin.

2. The underride protection device according to claim 1, wherein the core layer is formed from polyurethane-reinforced glass fibers.

3. The underride protection device according to claim 1, wherein the ribs are foam ribs composed of polyurethane.

4. The underride protection device according to claim 3, wherein the ribs have a density of five hundred kilograms per cubic meter.

5. The underride protection device according to claim 3, wherein, as viewed in cross-section, the ribs each have a trapezoid shape including a base that is materially connected to the upper cover layer.

6. The underride protection device according to claim 1, wherein the upper and lower cover layers are materially connected to the core layer, and the core layer is composed of polyurethane.

7. The underride protection device according to claim 1, wherein the core layer and the ribs are materially connected to the upper cover layer arranged therebetween as well as to the lower cover layer and the top layer in a double sandwich arrangement.

8. A vehicle comprising the underride protection device of claim 1.

9. The underride protection device according to claim 1, wherein the epoxy resin has a volume content of sixty percent glass fibers and quartz sand.

10. The underride protection device according to claim 1, wherein retaining sections of the top layer extend from the rib and are directly and materially connected to the upper cover layer.

11. The underride protection device according to claim 1, wherein each rib is completely encapsulated between the upper cover layer and the top layer.

12. The underride protection device according to claim 1, wherein the upper and lower cover layers are planar along their respective lengths.

13. The underride protection device according to claim 1, wherein the ribs and the core layer are both formed from foam.

14. An underride protection device for a battery-electric vehicle, said underride protection device comprising:

a sandwich arrangement including a core layer arranged between (i) an upper cover layer composed of a fiber-reinforced plastic material and (ii) a lower cover layer composed of the fiber-reinforced plastic material, and ribs arranged on and materially connected to the upper cover layer, wherein the ribs are surrounded by a respective top layer, wherein the respective top layer is also directly and materially connected to the upper cover layer at two retaining sections by laminating or gluing.

\* \* \* \* \*